Oct. 9, 1951 H. L. HORWITZ 2,570,239

TIME ZONE TELEPHONE METERING SYSTEM

Filed Dec. 15, 1948 3 Sheets-Sheet 1

INVENTOR
HENRY L. HORWITZ
BY Robert Harding Jr.
ATTORNEY

TIME ZONE TELEPHONE METERING SYSTEM

INVENTOR
HENRY L. HORWITZ
BY
Robert Harding Jr.
ATTORNEY

Oct. 9, 1951 H. L. HORWITZ 2,570,239

TIME ZONE TELEPHONE METERING SYSTEM

Filed Dec. 15, 1948 3 Sheets-Sheet 3

INVENTOR
HENRY L. HORWITZ
BY Robert Harding Jr.
ATTORNEY

Patented Oct. 9, 1951

2,570,239

UNITED STATES PATENT OFFICE 2,570,239

TIME ZONE TELEPHONE METERING SYSTEM

Henry Leopold Horwitz, Rutherford, N. J., assignor to Federal Telephone and Radio Corporation, New York, N. Y., a corporation of Delaware Application December 15, 1948, Serial No. 65,467

13 Claims. (Cl. 179—7.1)

This invention relates to automatic telephone systems and is particularly directed to new and useful improvements in time-zone metering.

When telephone charges are recorded on a meter associated with a calling subscriber's line, the meter is operated to add one or more counts to the total count depending upon the central office or zone in which the called subscriber's line is located. The number of times the meter is to be operated may be determined by the outgoing trunk or, in systems employing registers, by the office code recorded in the register for the called subscriber's number. The means for operating the register the proper number of times may likewise be controlled either from the outgoing trunk or from a special circuit which is seized by the register.

According to this invention the impulse repeater connected in the outgoing trunk is adapted to connect with an interrupter circuit common to a plurality of such repeaters. The line meter is then operated by the interrupter circuit a number of times as determined by the impulse repeater.

One object of the invention is to provide means in the repeater for preventing the further operation of the line meter after the count for a given call has been recorded.

A further object of the invention is to provide within the common interrupter circuit a means for measuring time whereby a repeater circuit may control the re-operation of the meter after a predetermined time interval has elapsed.

A still further object of the invention is to provide for the simultaneous operation of several line meters in such a manner that each line meter will be operated the proper number of times as determined by the repeater circuit.

A still further object of the invention is to arrange the interrupter circuit merely to signal to a repeater when a definite time interval has expired and to provide in the repeater itself a means for determining the predetermined interval allowed for a conversation. Means are provided for permitting several repeaters to measure time intervals not necessarily starting at the same instant.

Figure 1:
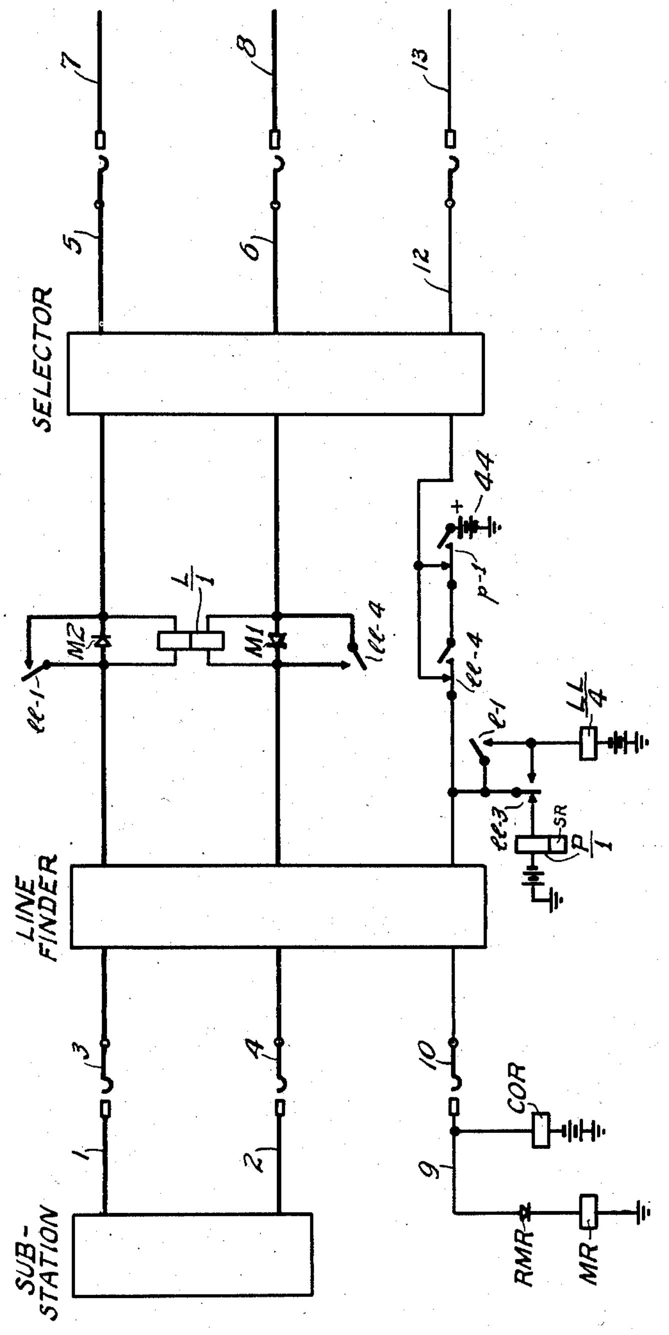

The above-mentioned and other features and objects of this invention and the manner of attaining them will become more apparent and the invention itself will be best understood, by reference to the following description of an embodiment of the invention taken in conjunction with the accompanying drawings, wherein:

Fig. 1 shows a line finder-selector link arranged to provide for the operation of the line meter.

Figure 2:
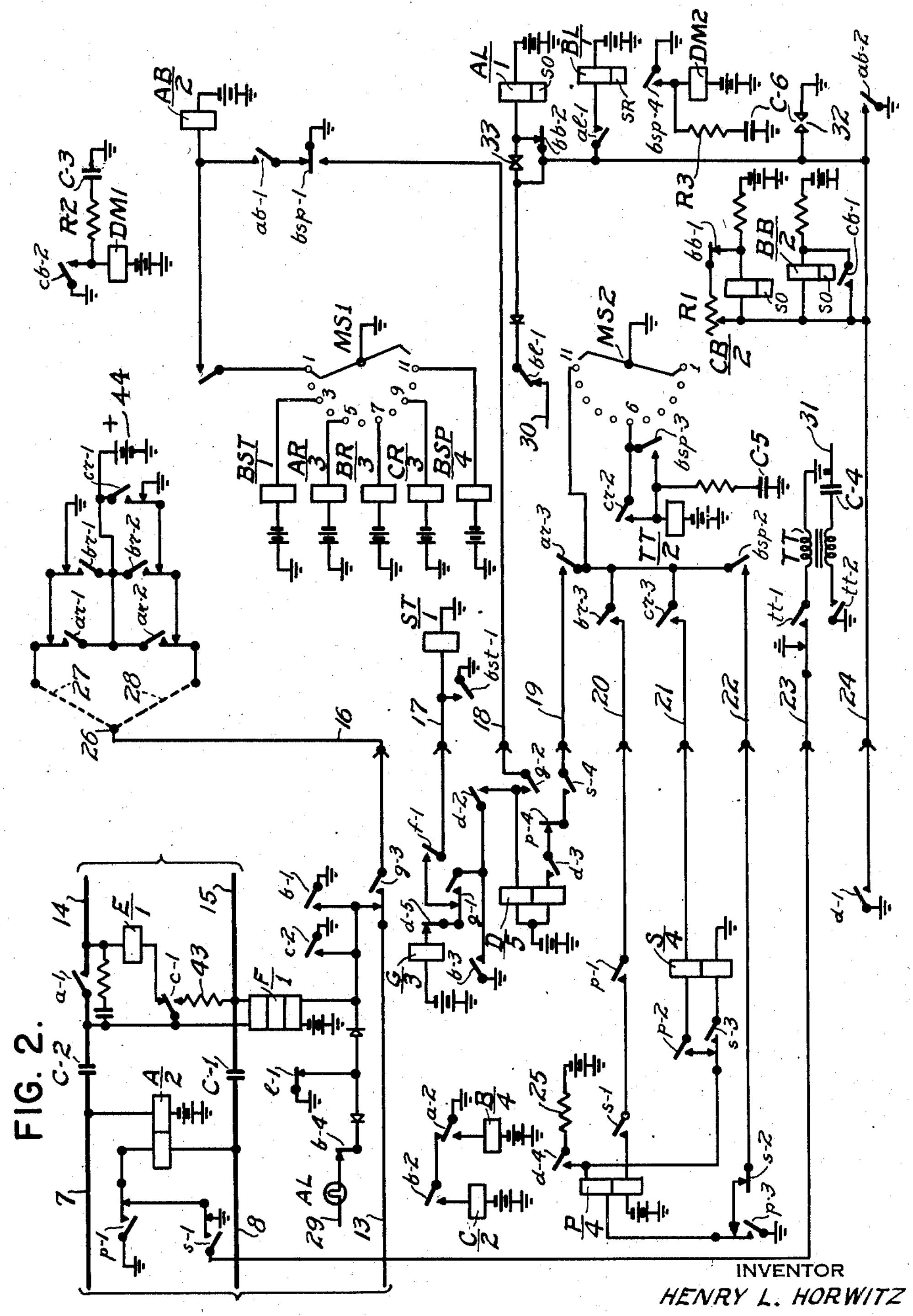
Figure 3:
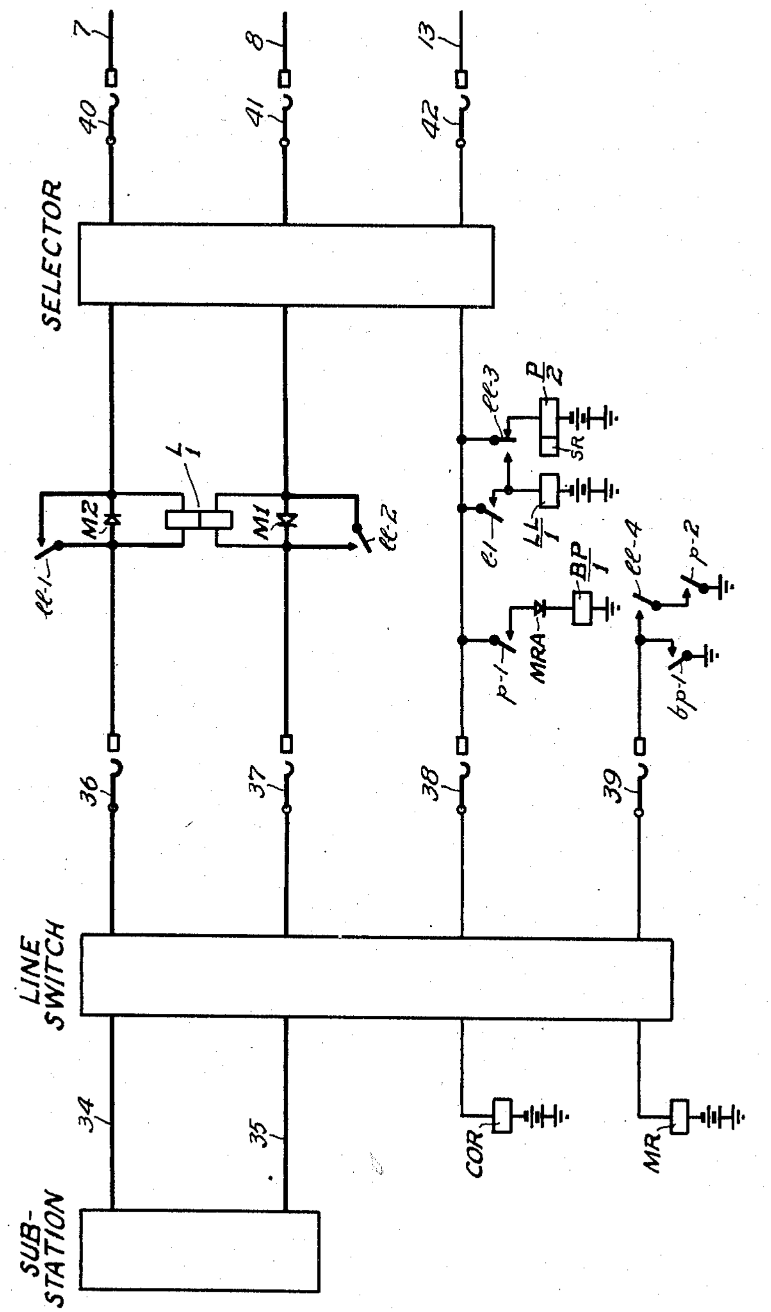

Fig. 2, which should be placed to the right of Figs. 1 or 3, shows an outgoing impulse repeater together with the common interrupter circuit which provides the time interval signals and applies booster battery for operating the meter as determined by a repeater.

Fig. 3 shows a line switch and selector arranged to provide for the operation of the line meter.

The circuits show the relay contacts dis-associated from the winding of the relay which controls them. The winding of the relay is designated by a capital or upper case letter under which a number appears to indicate the number of contacts controlled by the relay. The contacts of a relay are designated by a lower case letter followed by a distinctive number. In this description, the relay winding is designated by a capital letter such as A, B etc. and the contacts by a small letter such as *a1*, *a2*, *b1*, *b2*, etc.

*General description*

When the calling central office is equipped with line finders the circuits per Figs. 1 and 2 are used. When line switches are provided in the calling central office the circuit per Fig. 3 replaces the circuit per Fig. 1.

Referring to Fig. 1, the subscriber's line is connected through a line finder and a double wound relay L to the selector circuit.

The circuits for the line finder and selector, not shown, may be of the conventional type. When the selector is directively operated, brushes 5, 6 and 12 connect with conductors 7, 8 and 13 leading to the outgoing impulse repeater shown in Fig. 2.

Fig. 2 shows an impulse repeater and the common interrupter circuit to which one or more repeaters may connect themselves. Conductors 7 and 8 are extended through condensers *c1* and *c2* to conductors 14 and 15 of a trunk leading to a distant office. The distant central office is not shown but it may be any type of automatic office in which the current flowing over the two conductors 14 and 15 in series from the distant central office is reversed when the called party answers.

The common interrupter circuit for applying booster battery a number of times according to the distant office to which a trunk is connected, is shown at the right in Fig. 2. Conductors 16 to 24 inclusive connect to the several repeater circuits served by the common interrupter circuit. Conductor 16 is shown terminating in a terminal 26 with cross connections 27 and 28, one of which will be employed depending upon whether two or three operations of the meter are to be made. The common circuit includes two marker switches MS1 and MS2 with their magnets DM1 and DM2. The marker switch MS1 controls the application of the booster battery to the repeater circuits for operating the line meters. This switch is stepped under control of two relays BB and CB which are adjusted to operate and release in a predetermined time and thus provides a time measure for controlling marker switch MS1. Marker switch MS2, which operates once for each cycle of marker switch MS1, measures a definite time interval and controls the operation and release of the time measure relays of the repeater circuit.

In Fig. 3 the trunks to selectors from the line switches are reached through the brushes 36, 37, 38 and 39 of the line switch. The operation of the circuit is similar to that of the line finder-selector circuit of Fig. 1. The selector circuit is not shown and only that part of the line switch circuit necessary for the operation of the line meter is shown. The selector brushes 40, 41 and 42 are driven to the terminals 7, 8 and 13 of the repeater in the conventional manner.

*Operation with line finder-selector link*

When the receiver is removed from the switch-hook at the substation, the line finder is operated in the conventional manner and brushes 3, 4 and 10 connect with conductors 1, 2 and 9, as shown in Fig. 1. The line is connected through to the selector but relay L does not operate at this time because the direction of the flow of current is such that the rectifiers M1 and M2 short circuit the windings of relay L. When the subscriber dials, brushes 5, 6 and 12 of the selector are stepped in the conventional manner to connect with conductors 7, 8 and 13 leading to an idle repeater circuit shown in Fig. 2. Absence of ground on conductor 13 allows the selector to seize this circuit. Relay A is operated from the sub-station over a circuit from battery, right-hand winding of relay A, conductor 7, selector brush 5, upper winding of relay L in parallel with rectifier M2, line finder brush 3, conductor 1, subscriber station, conductor 2, line finder brush 4, lower winding of relay L in parallel with rectifier M1, selector brush 6, conductor 8, left hand winding of relay A, contacts *p1* and *s1* to ground.

The operation of relay A connects ground at *a2* to operate relay B. The upper winding of relay F is connected across trunk conductors 14 and 15 at contact *a1* which also short circuits the normally operated relay E. Relay F does not operate at this time due to the direction of the current from the distant office over conductors 14 and 15. The operation of relay B connects ground to holding conductor 13 to hold the connection from the selector and to make the repeater busy to other calls at contact *b1* which also energizes the polarizing winding of relay F. At contact *b4* part of the alarm circuit is opened and at contact *b3* a holding circuit for relay G is prepared to prevent its release during the metering cycle if the dialed subscriber, in answering, accidentally causes the intermittent operation of relay F and a holding circuit for relay D is prepared to prevent further metering on a call once the metering cycle is completed. At contact *b2*, the operation of relay B prepares part of the circuit for operating relay C during impulsing. Relay E, on restoring, closes contact *e1* to complete a multiple circuit to the polarizing winding of relay F and to provide a ground for part of the alarm circuit.

Relay A follows the impulses received from the calling dial at the sub-station and at contact *a1* repeats these impulses to the distant selectors over conductors 14 and 15 to establish the connection to a called station. When relay A releases, contact *a2* operates relay C on the first impulse and relay C remains operated during each series of impulses. Relay C, on operating, shunts the winding of relay F at contact *c1* with resistance 43 and opens the circuit to relay E to improve impulsing conditions. Relay B is slow to release and remains operated during impulsing. When relay C releases after the last impulse of each series, the shunt is removed from the winding of relay F and the short circuit is again placed on relay E.

When the called subscriber answers, current from the distant office over conductors 14 and 15 is reversed and relay F operates. This is the signal to the repeater circuit to operate the line meter. At contact *f1* a circuit is closed from battery, winding of relay G, back contacts *d5* and *g1*, front contact *f1*, common conductor 17, winding of relay ST to ground. Relay ST is a high resistance relay so that relay G is not operated at this time. Relay ST operates to energize the interrupter circuit if it is idle or to maintain the continued operation of the interrupter circuit if it is in use.

As previously described, the interrupter circuit comprises two marker switches MS1 and MS2. The marker switch MS1 operates relays BST, AR, BR, CR and BSP in sequence and contacts of these relays transfers the holding conductor from ground to booster battery 44 to operate the line meter. Each complete revolution of marker switch MS1 causes marker switch MS2 to advance one step. Marker switch MS1 is stepped under control of relays BB and CB at contact *cb2* which connects ground to the magnet DM1 of marker switch MS1. The relays BB and CB form a stepping control circuit. Ground from contact *ab2*, operates relay BB to remove the short circuit from the winding of relay CB at contact *bb1*. When CB operates the winding of relay BB is short circuited at contact *cb1*. The two relays BB and CB are slow acting relays and their cycle of operation may be controlled by resistance R1 to provide one revolution or cycle of marker switch MS1 in approximately 12 seconds. Hence, the marker switch MS2 advances one step for each 12 seconds making ten steps in 120 seconds or two minutes.

Magnet DM2 of marker switch MS2 is operated from ground at contact *bsp4*. Each time marker switch MS2 completes a cycle and is in position 11 ground is connected to one of the common wires 19 to 22 inclusive, which signals the repeater circuit to mark the elapsed time in intervals of two minutes. Since the interrupter circuit is common to a plurality of repeater circuits "pick-up" relays are employed to synchronize the repeater circuit with the time intervals and the line meter operations of the common interrupter circuit, as will be described later.

As previously described, relay ST is operated when contact *f1* of a repeater circuit is closed by the operation of relay F. At contact *st1* a circuit is completed from ground, marker switch MS1 in position 1, winding of relay AB to battery. Relay AB operates and locks through its contact *ab1* to contact *bsp1*. At contact *ab2* the interrupter relays BB and CB begin operating as previously described. This energizes magnet DM1 intermittently and steps the marker switch MS1 over the bank contacts to operate relays BST, AR, BR, CR and BSP in sequence as the brush of marker switch MS1 passes bank terminals 3, 5, 7, 9 and 11.

It will be noted that a momentary short circuit is placed on the winding of relay ST by contact

*bst1* as the marker switch MS1 is passing over position 3 to operate relay G. Relay G is operated as a "pick-up" relay only at the beginning of the interrupter cycle, thus insuring the proper number of metering pulses. If the interrupter circuit is engaged, a repeater circuit cannot connect its holding conductor to common conductor 16 until marker switch MS1 passes over position 3 on the next cycle. When relay ST1 is operated, contact *st1* completes a circuit for operating relay AB from ground, brush and terminal 1 of marker switch MS1, contact *st1*, winding of relay AB to battery. Relay AB locks via contacts *ab1* and *bsp1* to ground. At contact *ab2* ground is connected to the stepping control relays BB and CB. Normally relay CB is short circuited by contact *bb1* of relay BB and when relay CB operates contact *cb1* short circuits relay BB. Each operation of relay CB, at contact *cb2*, closes the circuit for the magnet DM1 of the marker switch MS1 and the brush is advanced to the next position. When the brush moves off normal contact 12 of marker switch MS1 is closed to insure that the marker switch MS1 completes a cycle. As the brush of marker switch MS1 is stepped from position to position, ground is connected to relays BST in position 3, AR in position 5, BR in position 7, CR in position 9, and BSP in position 11.

The operation of relay BST, at contact *bst1*, short circuits relay ST and operates relay G of the repeater circuit. Contact *g3* of relay G transfers holding conductor 13 from ground at contact *b1* of the repeater circuit to conductor 16 of the interrupter circuit. If cross connection 27 is used the interrupter circuit will apply booster battery 44 to holding conductor 13 when AR operates and when BR operates as the marker switch is passing through positions 5 and 7 respectively, thus applying metering current to holding conductor 13 to operate the line meter twice and add two counts to the meter. If cross connection 28 is employed booster battery 44 will be applied to conductor 13 three times by the additional operation of relay CR when the marker switch passes through position 7. Thus, as shown in Fig. 2, the interrupter circuit may cause 2 or 3 operations of the line meter.

It is to be noted that when the subscriber answers and relay F operates, the current to the calling subscriber through relay A is not reversed. Hence, relay L of Fig. 1 is not operated on connections through the repeater. Referring to Fig. 1, when booster battery is applied to conductor 13 line meter MR is operated via selector brush 12, contact 114, line finder brush 10, conductor 9, and rectifier RMR. The operation of relay P of Fig. 1 at this time is ineffective.

At contact *g2*, the upper winding of relay D is connected over common conductor 18 through contact *bsp1* of relay BSP. When the marker switch completes its cycle and relay BSP operates in position 11, relay D is operated and locks to holding relay B at contacts *b3* and *d2*. At contact *d5*, relay D opens the circuit of relay G which releases. Relay D remains energized being locked to contact *b3* of relay B. When relay BSP operated, a circuit for marker switch MS2 is closed at contact *bsp4* and magnet DM2 of marker switch MS2 operates. Ground from contact *d1* of relay D of the repeater circuit over common conductor 25 continues the operation of the interrupter relays BB and CB and marker switch MS1 continues to rotate. Each time marker switch MS1 completes a cycle and at position 11 operates relay BSP, marker switch MS2 is advanced one position. Marker switch MS2 continues its operation on every cycle of marker switch MS1 until it reaches position 11, and marker switch MS1 continues through the next cycle.

As previously described, the operation of the stepping control relays BB and CB is such that marker switch MS2 completes a cycle by taking eleven steps in approximately two minutes. Each time marker switch MS2 reaches the eleventh position, ground is placed on common conductors 19, 20, 21 and 23. Thus, if ground is applied to someone of these four leads on each revolution of marker switch MS2 a total time of eight minutes will have elapsed. The circuit is arranged so that each pulse over the common leads 19 to 22 inclusive, is operative in the repeater circuit in the reverse order. The first metering cycle may vary from approximately six to eight minutes but each succeeding timing cycle will remain constant at approximately six minutes.

When marker switch MS2 arrives at position 11 on the first cycle and marker switch MS1 passes position 11 to operate relay BSP, ground from the marker switch MS2, position 11, contact *bsp2*, common conductor 22, contacts *s2* and *p3*, upper winding of relay P4, contact *d4*, resistance 25 to battery operates relay P. Relay P on operating, locks itself at contact *p3*, prepares the operating circuit at relay S at *p2* and opens knockdown circuit of relay D at *p4*. On the next cycle when MS2 reaches position 11 and relay CR is operated as MS1 passes through position 7, relay S is operated from ground, marker switch MS2, position 11, contact *cr3*, conductor 21, upper winding of relay S, contacts *p2*, *s3* and *d4*, resistance 25 to battery. Relay S locks to battery through resistance 25 on its lower winding. The operation of relay S closes part of the knockdown circuit for relay D at *s4*, opens the operating circuit of relay P at *s2* and closes the knockdown circuit for relay P at *s1*. When the marker switch HS2 in the next cycle then arrives at position 11, ground through contact *br3*, when relay BR operates in position 5 of marker switch MS1, conductor 20, contacts *p1* and *s1*, energizes the lower winding of relay P which causes relay P to release. Relay P opens the starting circuit for relay S and closes the knockdown circuit for relay D.

It is to be noted at this time that relay P which, when operated, connected ground directly to the right hand winding of battery feed relay A, now connects this winding through contacts *p1* and *s1*, contact *tt1* to ground over common conductor 23. On the last cycle, when the marker switch MS2 arrives in position 6 or approximately one minute before the next operation of the meter, relay TT operates when relay CR is operated by MS1 via contact *cr2* and holds until MS1 passes through position 11 to operate relay BSP. During the operation of relay TT, warning tone is applied through the right hand winding of relay A to the calling subscriber so that he may hang up before the second metering is started.

If he does not hang up then when the marker switch MS2 arrives in position 11 and relay AR operates in position 5 of marker switch MS1, ground over conductor 19 energizes the lower winding of relay D causing the relay to release. The release of relay D re-connects relay G to the start relay ST and the metering and timing cycle is repeated. It is obvious that the cycle of timing and metering for overtime will be repeated until the connection is released.

It is to be noted that a plurality of repeater circuits may be in the process of timing and metering under control of the common interrupter circuit because the timing is controlled by the sequential operation and release of the relays D, P and S of each repeater circuit.

It is also to be noted that the holding conductor 13 is extended by contact $g3$ of relay G to the common conductor 16 and thence as required to the booster battery 44. Relay G is released after the completion of metering and is prevented from further operation by the operation of relay D when marker switch MS1 completes a first cycle of operation. Relay D cannot be released until the timing cycle is completed. If the timing cycle is completed and the connection is still held by the calling party, relay G is again operated and the complete cycle of timing metering is repeated.

It is also to be noted that when the relay G is operated, the connection cannot be released by the calling party because the release of the connection is controlled solely by the interrupter circuit through contact $g3$. This insures the recording of the complete charge for the call.

When the calling party disconnects, relay A is released followed by relays B and F. Relay C is operated momentarily and connects ground to holding conductor 13 to guard the repeater against seizure by other calls while the distant automatic selectors are releasing.

Relay E is a high resistance relay, normally operated from battery from the distant end, and may function as an alarm relay. If the trunk conductors should become grounded or open, relay E releases. Contact $e1$ connects ground to holding conductor 13 and via contact $b4$ to the alarm lamp and alarm conductor 29. The repeater is made busy and cannot be seized when a fault occurs on the trunk.

An alarm is provided for the common interrupter circuit. Whenever ground is applied to this circuit over common conductor 24 or from the contact $ab2$ of the offnormal contact 32 of marker switch MS1, the operating circuits for relays AL and BL are closed. Relay AL is a slow operating relay and relay BL is a slow release relay. Relay BL operates when stepping control relay BB fails to operate within the operating time of relay AL. If this should occur, indicating that the stepping circuit for marker switch MS1 has failed, the operation of relay AL opens the circuit for relay BL and after a time BL will release and complete the circuit to the alarm conductor 30. Magnet DM2 of marker switch MS2 controls a contact 33 which opens each time the magnet operates. If the magnet fails to release this circuit the operation of relay BB releases AL and after a time BL releases and completes the circuit to alarm conductor 30.

*Operation of line meters with line finder-selector links on local calls*

Referring to Fig. 1, when the receiver is removed from the switchhook the line finder is operated and brushes 3, 4 and 10 connect with conductors 1, 2 and 9. Battery, not shown, from the selector is extended to the subscriber's station and ground is applied to the holding conductor 12 to operate relay P. Relay L is prevented from operating by the rectifiers M1 and M2 and relay L cannot operate until battery is reversed over conductors 7 and 8 when the called party answers. This operates relay L and in turn relay LL operates from ground on the holding conductor. Relay LL opens the circuit of slow release relay P. Until relay P releases, contact $p1$ connects the booster battery 44 via contact 114 to line finder brush 10 and conductor 9 to operate the meter MR. It is to be noted that when the circuit of Fig. 1 is connected to the repeater there is no reversal of battery to cause the operation of relay L and the consequent operation of the meter as just previously described. Hence, booster battery applied to holding conductor 13, as described, will operate the meter directly.

*Operation of line meters with line switches*

When line switches are employed to connect a calling line to a selector the circuit per Fig. 3 is used. Line meter MR is operated over a separate conductor 39. When battery is reversed on a local call, relay L operates and in turn operates relay LL. Relay P releases slowly and completes a circuit from ground, contacts $p2$ and 114 to conductor 39 to operate meter MR. When battery is not reversed, due to the repeater of Fig. 2, the booster battery from holding conductor 13, via selector brush 42 operates relay BP which is in series with a rectifier MRA. The operation of relay BP closes ground via contact $bp1$ to conductor 39 thereby operating the meter MR each time relay BP is operated.

While I have described above the principles of my invention in connection with specific apparatus it is to be clearly understood that this description is made by way of example and not as a limitation to the scope of my invention.

I claim:

1. In an automatic telephone system, meters connected to subscriber's lines for recording the charges for calls, automatic selectors and repeaters for establishing connections from calling to called lines, an interrupter circuit operatively connected to be seized concurrently by one or more of the repeaters, means controlled by the interrupter circuit for operating the line meters, and means in said interrupter circuit for controlling the operation of said line meters a number of times as determined by the one of said repeaters connected thereto.

2. The system according to claim 1, and, in which the line meters connected to a plurality of calling subscriber's lines are operated simultaneously, the number of operations of each meter being determined by the particular repeater included in the established connection.

3. In an automatic telephone system, subscriber's lines, automatic selectors and impulse repeaters for establishing connections from calling to called lines, service meters connected to the subscriber's lines and operable for recording one or more service counts depending upon an established connection, an interrupter circuit operatively connected to be seized in common by one or more impulse repeaters, means under control of the interrupter circuit for operating the service meters, and means in said interrupter circuit for operating the first said means a number of times as determined by said impulse repeater included in an established connection.

4. The system according to claim 3, and, in which the service meters connected to a plurality of calling subscriber's lines are operated simultaneously, the number of counts of each meter being determined by the particular repeater included in the connection established by the calling subscriber.

5. In an automatic telephone system, subscriber's lines, automatic selectors and impulse repeaters for establishing connections from calling to called lines, a service meter connected to each subscriber's line and operable to record one or more counts depending upon an established connection, an interrupter circuit operatively connected to be seized in common by one or more impulse repeaters, means under control of the interrupter circuit for operating the service meter connected to a calling line when the called line answers, means in the interrupter circuit for operating the first means a number of times as determined by the impulse repeater included in the established connection, and means in said repeater for preventing the further operation of said service meter.

6. In an automatic telephone system, a plurality of subscriber's lines each including a service meter connected thereto, a plurality of automatic selectors and repeaters for establishing connections from a calling line to a called line, an interrupter circuit connected to be seized in common by a plurality of repeaters, means under control of the interrupter circuit for operating the service meter connected to a calling line when the called line answers, and means in the interrupter circuit for simultaneously operating a plurality of service meters each connected to a calling line as determined by the repeater included in the individual connection established by each calling line.

7. In an automatic telephone system, a calling subscriber's line, automatic selectors and an impulse repeater for establishing a connection from the calling line, a service meter connected to the calling line and operable to record one or more counts as determined by the impulse repeater, an interrupter circuit connected to be seized in common by one or more impulse repeaters, means under control of the interrupter circuit for operating the service meter, and means in said interrupter circuit for controlling the operation of said service meter a number of times as determined by said repeater.

8. In an automatic telephone system, subscriber's lines, automatic selectors and impulse repeaters for establishing connections from calling to called lines, service meters connected to said subscriber's lines and operable to record one or more counts depending upon an established connection, an interrupter circuit positioned to be seized in common by two or more impulse repeaters, means under control of the interrupter circuit for operating the service meters a number of times as determined by the impulse repeater included in an established connection, preventive means in the repeater for preventing the further operation of the service meter, means in the interrupter circuit for measuring an interval of time, and means in said repeater circuit for rendering said time measure effective to remove said preventive means and permit the further operation of said service meter after a predetermined time is measured.

9. In an automatic telephone system, subscriber's lines, automatic selectors and impulse repeaters for establishing connections from calling to called lines, service meters connected to said subscriber's lines and operable to record one or more counts as determined by the impulse repeater employed in an established connection, an interrupter circuit operatively connected to be seized in common by two or more impulse repeaters including relays operated sequentially by a marker switch for controlling the operation of the service meters and stepping relays for operating said marker switch.

10. The system according to claim 9, in which said stepping relays are connected to operate said marker switch in predetermined time steps.

11. In an automatic telephone system, subscriber's lines, automatic selectors and impulse repeaters for establishing connections from calling to called lines, service meters connected to said subscriber's lines and operable to record one or more counts as determined by the impulse repeater employed in an established connection, an interrupter circuit positioned to be seized in common by two or more impulse repeaters, means under control of the interrupter circuit for operating the service meters, a first marker switch included in the interrupter circuit controlled by timed stepping relays for operating the first means, a second marker switch included in the interrupter circuit arranged to advance one position for each complete cycle of the first marker switch, relays in the impulse repeater connected to be operated in sequence by a combined action of the two marker switches included in the interrupter circuit, a circuit for the relays, and means included in said circuit for preventing the re-operation of the service meter until a predetermined time has elapsed.

12. In an automatic telephone system, subscriber's lines, automatic selectors and impulse repeaters for establishing connections from calling to called lines, service meters connected to said subscriber's lines and selectively operable to record one or more counts as determined by the impulse repeater employed in an established connection, an interrupter circuit connected to be seized in common by two or more impulse repeaters, means under control of the interrupter circuit for operating the service meters, first and second marker switches included in the interrupter circuit, the first marker switch being controlled by timed stepping relays and operative to actuate the first means, the second marker switch being advanced one position for each complete cycle of the first marker switch, relays individual to each impulse repeater operable to prevent the reoperation of the service meter and to count the cycles of the second marker switch, a circuit for the relays, and means included in said circuit for rendering the interrupter circuit operative to reoperate the service meters after a predetermined time has been measured by the repeater circuit.

13. The system according to claim 12, and in which, when two or more repeaters are connected to the common interrupter circuit simultaneously each repeater measures the elapsed time in terms of cycles of the second marker switch independently of the others.

HENRY LEOPOLD HORWITZ.

REFERENCES CITED

The following references are of record in the file of this patent:

UNITED STATES PATENTS

| Number | Name | Date |
|---|---|---|
| 2,232,181 | McClew et al. | Feb. 18, 1941 |
| 2,331,013 | Balzer | Oct. 5, 1943 |
| 2,372,353 | Bascom | Mar. 27, 1945 |
| 2,457,946 | Taylor | Jan. 4, 1949 |
| 2,492,381 | Dunning | Dec. 27, 1949 |